(12) United States Patent
Berger et al.

(10) Patent No.: US 8,015,664 B2
(45) Date of Patent: Sep. 13, 2011

(54) TWIN-WHEEL CASTER

(75) Inventors: Ernst Berger, Jettingen (DE); Ralph Von Bordelius, Herrenberg (DE)

(73) Assignee: Gross & Froelich GmbH & Co. KG, Weil der Stadt (DE)

( * ) Notice: Subject to any disclaimer, the term of this patent is extended or adjusted under 35 U.S.C. 154(b) by 561 days.

(21) Appl. No.: 11/919,111

(22) PCT Filed: Apr. 27, 2006

(86) PCT No.: PCT/EP2006/003915
§ 371 (c)(1), (2), (4) Date: Oct. 22, 2007

(87) PCT Pub. No.: WO2006/117128
PCT Pub. Date: Nov. 9, 2006

(65) Prior Publication Data
US 2009/0049647 A1    Feb. 26, 2009

(30) Foreign Application Priority Data

Apr. 29, 2005 (DE) .................. 10 2005 020 438

(51) Int. Cl.
*B60B 33/00* (2006.01)
(52) U.S. Cl. ............................. 16/47; 16/35 R
(58) Field of Classification Search ............ 16/35 R, 16/35 D, 47, 48, 31 R, 44; 188/1.12, 29, 188/69, 31; 280/64, 65, 47.38, 47.39, 47.41
See application file for complete search history.

(56) References Cited

U.S. PATENT DOCUMENTS

| 4,212,092 A | * | 7/1980 | Ferrari | 16/35 R |
| 4,219,904 A | * | 9/1980 | Melara | 16/47 |
| 4,290,166 A | * | 9/1981 | Melara | 16/47 |

(Continued)

FOREIGN PATENT DOCUMENTS

| DE | 29 27 549 A1 | 1/1981 |
| EP | 0 458 446 A1 | 11/1991 |
| EP | 1 110 757 A2 | 6/2001 |
| EP | 1 535 756 A1 | 6/2005 |
| FR | 2485448 A * | 12/1981 |

OTHER PUBLICATIONS

International Search Report dated Sep. 20, 2006 (3 pages).

*Primary Examiner* — Chuck Y. Mah
(74) *Attorney, Agent, or Firm* — Flynn, Thiel, Boutell & Tanis, P.C.

(57) ABSTRACT

The invention relates to a twin-wheel caster provided with a housing containing a journal opening on a top side thereof, which is oriented in a substantially vertical direction for receiving a pivot connecting a roller to a furniture or another object, a shaft-shaped slide opening on the lower side thereof, which is laterally offset with respect to the journal opening and used for receiving a cross head supported by the housing with the aid of a spring, wherein the cross head has a through opening which is oriented in a substantially perpendicular direction with respect to the shaft-shaped slide opening and receives a swivel pin bearing two wheels, is placed in the housing in such a way that it is slidable between rolling and braking positions and recesses embodied in the slide opening limiting walls and used for passing the swivel pin. The housing has two projections which are arranged in the internal space thereof, adjacent to the slide opening, laterally extend from the housing wall and frictionally support two hubs of the wheels in the braking position.

11 Claims, 5 Drawing Sheets

U.S. PATENT DOCUMENTS

| | | | | |
|---|---|---|---|---|
| 4,455,707 A | * | 6/1984 | Screen | 16/35 R |
| 4,821,369 A | * | 4/1989 | Daniels | 16/35 R |
| 5,355,550 A | * | 10/1994 | Yang | 16/44 |
| 5,537,715 A | | 7/1996 | Yang | |
| 5,617,934 A | * | 4/1997 | Yang | 188/1.12 |
| 6,092,262 A | * | 7/2000 | Lin | 16/35 R |
| 6,256,835 B1 | * | 7/2001 | Wang | 16/35 R |
| 2001/0039693 A1 | | 11/2001 | Melara | |
| 2005/0108851 A1 | | 5/2005 | Dayt | |

\* cited by examiner

TWIN-WHEEL CASTER

FIELD OF THE INVENTION

The invention relates to a twin-wheel caster, with a housing having an essentially vertically oriented, top-side pin opening for receiving a pivot pin in order to connect the caster to an item of furniture or to another object, with a shaft-shaped, bottom-side slide opening which is offset laterally with respect to the pin opening and is intended for receiving a slide which is supported in the housing via a spring, has a passage opening, which is oriented essentially transversely with respect to the slide opening, for an axle pin which bears the wheels, and which is arranged in the housing in a manner such that it can be displaced between a rolling position and a braking position, and with recesses in the wall portions bounding the slide opening, for the passage of the axle pin.

DESCRIPTION OF RELATED ART

Caters of this type are used on a large scale, for example for movable office chairs, with a differentiation being made between braked and unbraked casters. A braked caster has a rolling position in the loaded state, for example, if a person is sitting on a chair provided with casters of this type, in order to permit the desired mobility, and, for safety reasons, has a braking position in the unloaded state in order to prevent the chair from unintentionally and unnoticeably rolling away. In order to realize this, it is known to integrate a spring mechanism into the caster, in which, in a simple configuration, a helical spring mounted in the housing acts directly on the axle pin, which is displaceable to a limited extent in a housing slot, and, by means of the displacement of said axle pin when there is a change in the load state, brings the casters into engagement with a braking member of the housing or releases them therefrom. A disadvantage of this solution is that the axle pin is subject, due to friction against the spring, to a comparatively high degree of wear which may result in the axle pin breaking. Furthermore, a caster is known, in which the axle pin is mounted in a slide which is supported in the housing via a spring, with the change between rolling and braking position being undertaken as mentioned above. The axle pin is guided here in slots in the housing wall portions which bound the slide opening, and its displacement travel is limited by the upper and lower edges of said slots. This permits only inadequate guidance of the slide, and therefore the axle pin, if loaded obliquely, can tilt slightly in relation to the housing, as a result of which the wheels also tilt relative to the housing, which, in addition to an unsatisfactory aesthetic appearance, may also result in functional disturbances of the caster. In the event of a shock-like loading, the axle bolt strikes against the upper edge of the slot and, as a result, may damage the housing wall which has comparatively little stability. Furthermore, in the case of this known caster, because the housing walls run in a planar manner and perpendicularly with respect to the floor, there is scarcely any protection against the penetration of dirt into the bearing region of the axle pin and, conversely, against the escape of lubricating grease, which results in the dirtying of the surface on which it stands.

BRIEF SUMMARY OF THE INVENTION

Taking this as the starting point, the object of the present invention is to provide a caster of the type mentioned at the beginning which, with simple means, makes possible a reliable braking action and, at the same time, is insensitive to dirt.

To achieve this object, an inventive combination of features is proposed. Advantageous refinements and developments of the invention are also presented.

According to the invention, the housing has, in its lower region, two projections which adjoin the slide opening, protrude laterally from the housing wall and on which hubs of the wheels are frictionally supported in the braking position. The projections therefore not only permit, in the form as it were of brake shoes, a braking of the caster, but also, by virtue of their covering of the lower housing part and of the axle pin, effectively protect the spring mechanism in the region of the axle pin from dirt and prevent lubricating grease from emerging. The projections expediently extend at least along the width of the slide opening. The projections therefore reinforce the housing in the region of the slide opening. The projections can extend in the direction of the wheels to an extent such that freewheeling of the wheels is still ensured.

A high braking action arises if the relative bearing surface between the wheel hub and the projection is as large as possible. In a preferred refinement of the invention, it is therefore provided that the projections which protrude laterally from the housing wall have partially circular, preferably semicircular, depressions which adjoin the recesses in the wall portions bounding the slide opening and on which outside portions of the hubs of the wheels bear in a sheet-like manner over part of the circumference in the braking position. The radius of the recess therefore corresponds essentially to the radius of the hub.

A high load-bearing capacity of the caster is provided if, in a preferred development of the invention, the slide is supported in the rolling position on the base of the slide opening. There is therefore no direct contact between the housing and the axle pin that could damage the housing in the event of shock loading, and instead the slide bears over a comparatively large area against the large base of the slide opening. Furthermore, a blind hole which adjoins the slide opening and is intended for a connecting piece which is arranged on the slide and the length of which is shorter than the free length of the spring accommodated in it can be provided in the housing. The connecting piece facilitates the assembly, since it captively accommodates the spring when the slide is introduced into the housing, and increases the slide length guided in the housing, thus further increasing the stability of the arrangement. This purpose is also served by a preferred refinement of the invention, according to which the slide has an essentially rectangular cross-section with two integrally formed guide ribs which are arranged transversely with respect to the passage opening of the axle pin. As an alternative, the slide can have an essentially dumbbell-shaped cross-section, with the respective T-shaped end portions engaging in corresponding undercuts of the slide opening and preventing the housing from being levered up under load.

In a further preferred refinement of the invention, the axle pin is pressed into the passage opening of the slide, with it being possible for it to have a knurled portion or similar profiling on its portion mounted in the slide in order to obtain a form-fitting and frictional connection. A particularly secure seat of the wheels on the axle pin is provided if the axle pin is provided on both sides of the housing with two undercuts which are arranged at a distance from each other and with which beads on the inside of the tubular hubs are in engagement. The hubs of the wheels can extend axially into the region of the wall portions which bound the slide opening.

The housing and/or the slide are preferably designed as injection-molded parts made of plastic. While up to now, a polyamide has predominantly been selected as the plastic for mechanical strength reasons, the design according to the invention of the housing permits the use of a comparatively cost-effective polypropylene plastic.

The invention is explained in more detail below with reference to an exemplary embodiment illustrated schematically in the drawing, in which:

BRIEF DESCRIPTION OF THE DRAWINGS

FIG. 1a shows a view of an exemplary embodiment of the caster according to the invention, from below;

FIG. 1b shows a longitudinal section through the caster along the line b-b in FIG. 1a;

FIG. 1c shows a side view of the caster;

FIG. 1d shows a section through the caster along the line d-d in FIG. 1c;

DETAILED DESCRIPTION OF THE INVENTION

Figure 1:
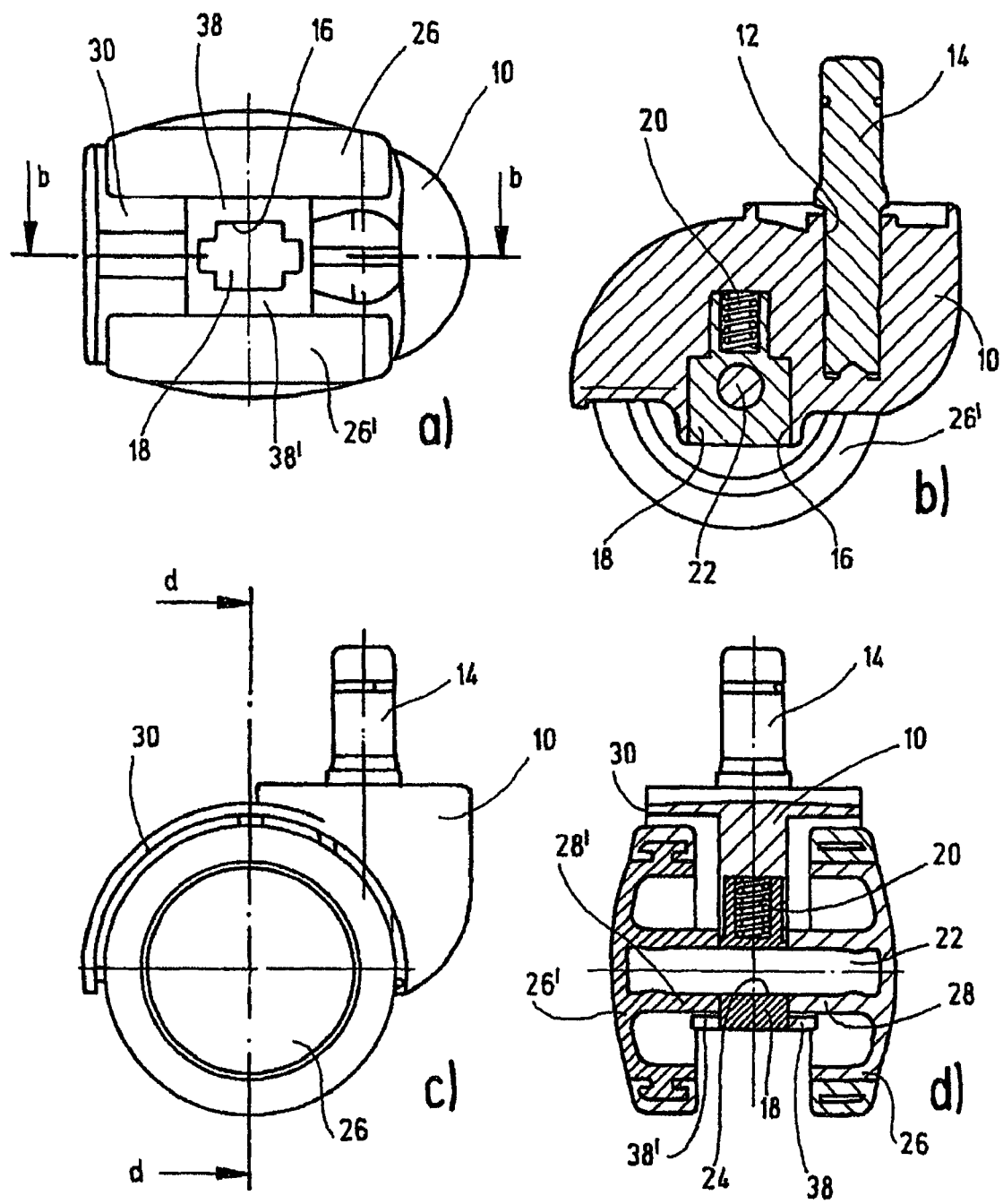

The caster illustrated in the drawing (FIG. 1) essentially comprises a housing 10 with a pin opening 12 for receiving a pivot pin 14, by means of which the caster is fastened rotatably to an item of furniture or the like, and with a slide opening 16 for receiving a slide 18 which can be displaced vertically in the housing 10 counter to the force of a spring 20 between a rolling position and a braking position, the caster also comprising an axle pin 22 which is pressed into a passage opening 24 of the slide 18 and is oriented transversely with respect to the slide opening 16, and two wheels 26, 26' with tubular hubs 28, 28' which are plugged on to the free ends of the axle pin 22 and rotate thereon. The wheels comprise a wheel body with running surfaces made of a material matched to the intended purpose sprayed on to it. A curved roof 30 of the housing 10 covers the upper region of the wheels 26, 26'.

Figure 2:
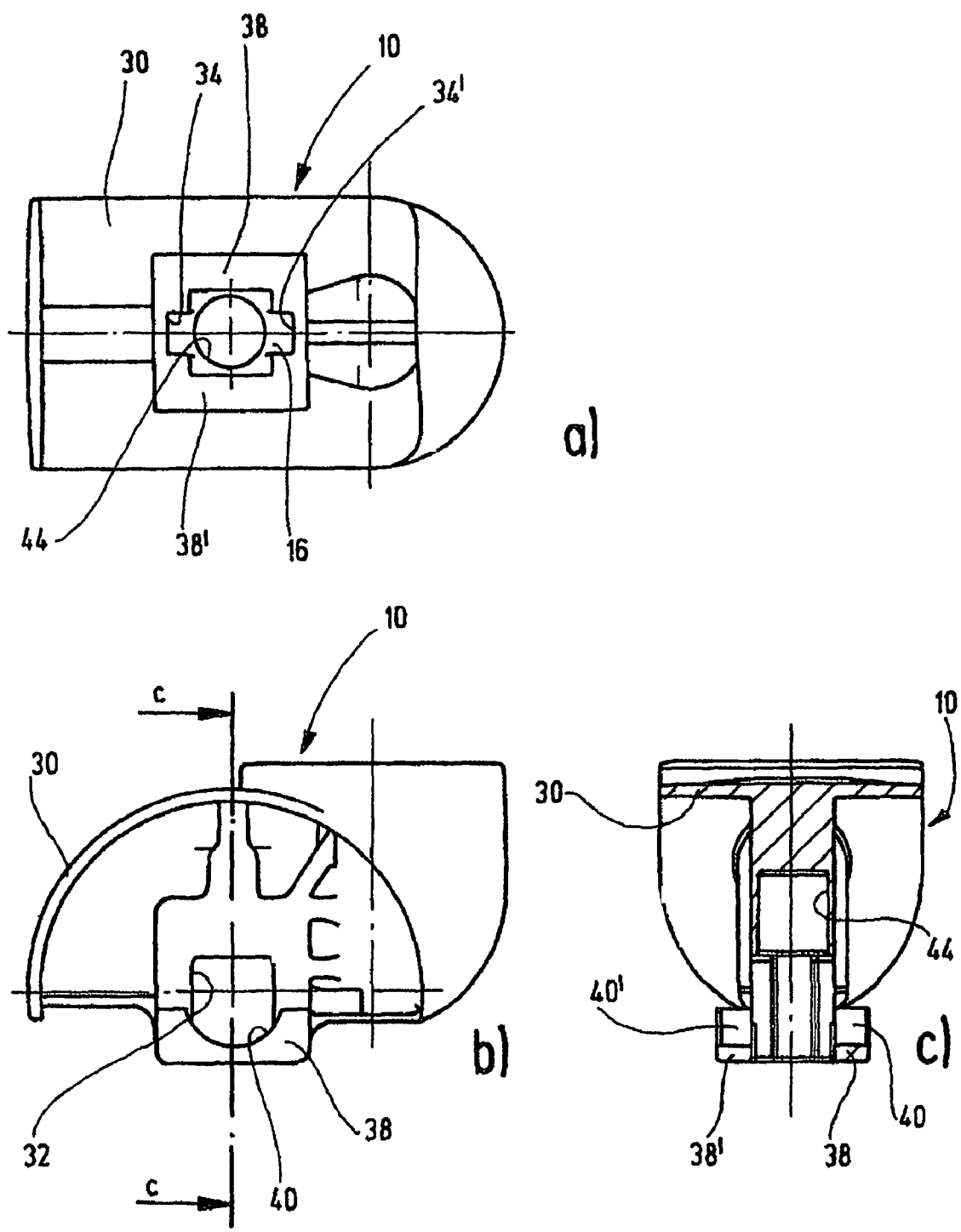
FIG. 2a shows a view of the housing of the caster illustrated in FIG. 1, from below.
FIG. 2b shows a side view of the housing.
FIG. 2c shows a section through the housing along the line c-c in FIG. 2b.

The housing (FIG. 2) has, in the region of the slide opening 16 recesses 32 through which the slide 18 passes and which guide the latter. Transversely thereto the housing has grooves 34, 34' in which ribs 36, 36' integrally formed on the slide 18 engage. This measure also serves better to guide the slide 18 and increases the load-bearing capacity of the arrangement. At the lower end of the slide opening 16, two projections 38, 38' protrude laterally from the housing wall. Said projections 38, 38' fulfill three functions simultaneously. Firstly they have partially circular depressions 40, 40'. The latter have a radius of curvature which corresponds to the radius of the adjacent portions of the hubs 28, 28' and, in the braking position of the caster, form a bearing surface, which imparts a frictional connection, for said hub portions. Furthermore, they form a lateral covering for the hubs and housing region situated above them, and therefore dirt is prevented from entering there. Finally, they reinforce the housing 10 in the region of the slide opening 16 in such a manner that the housing portion which receives the slide 18 can be of comparatively slender design. This enables the hubs 28, 28' of the wheels to be of a particularly long design and guided into the region of the recesses 32, as a result of which they can have a comparatively large receiving depth for the axle pin 22, which increases the stability and supporting capacity of the caster. Overall, these measures make it possible to considerably reduce the use of material for the production of the housing 10 while maintaining required values for the load-bearing capacity.

Figure 3:
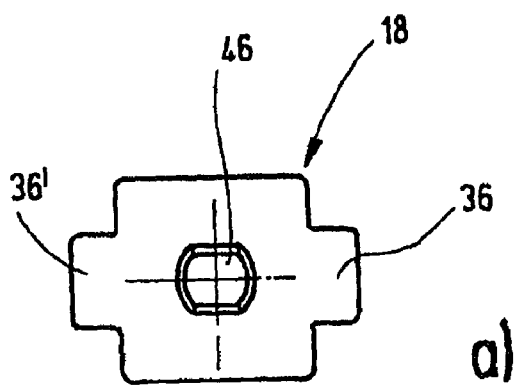
FIG. 3a shows a view of the slide of the caster from below.
FIG. 3b shows a side view of the slide.
FIG. 3c shows a section through the slide along the line c-c in FIG. 3b.
FIG. 3d shows a view of the slide from above.
Figure 3:
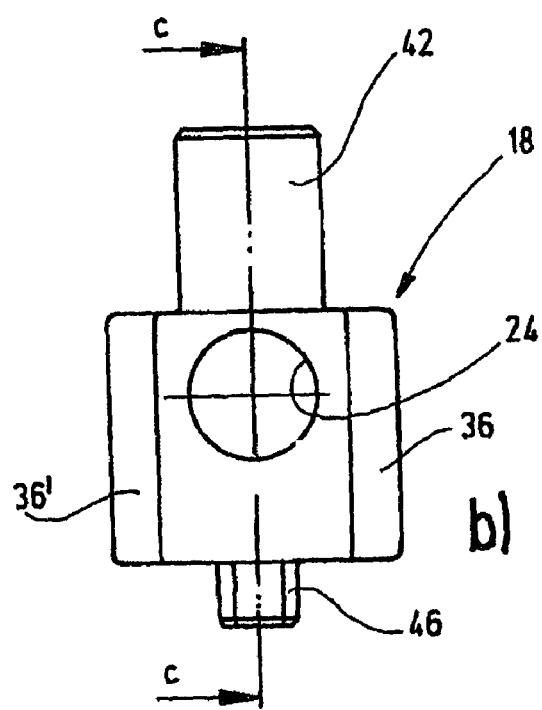
Figure 3:
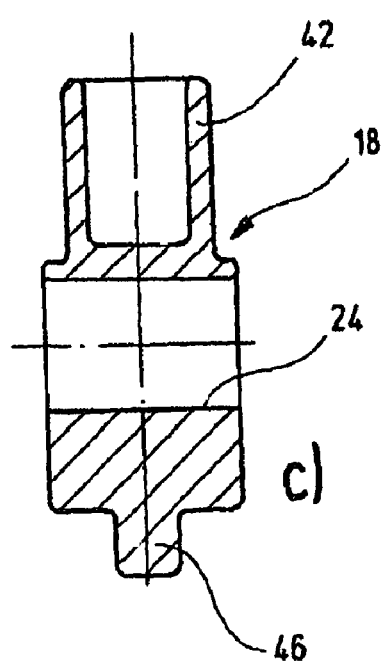
Figure 3:
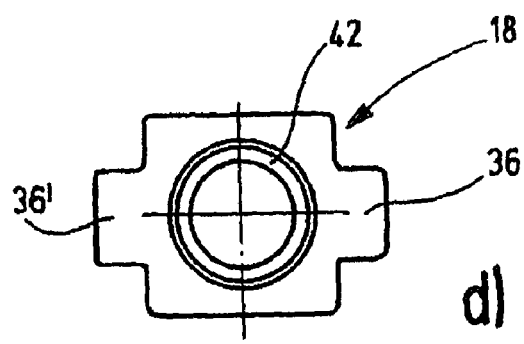

The slide 18 (FIG. 3) has a connecting piece 42 for receiving the spring 20, which dips into a blind hole 44 in the base of the slide opening 16 and is somewhat shorter than the free length of the spring 20. The spring 20 is firstly supported on the base of the blind hole 44 and secondly on an upper wall portion of the slide 18. Furthermore, the slide 18 has a short pin extension 46 at its floor-side end. This facilitates the mechanical handling of the slide 18 during the assembly of the caster. The integrally formed ribs 36, 36' and the connecting piece 42 result in the slide 18 being guided in the complementary shaped housing 10 in a highly stable and load-bearing manner. In the rolling position, the top side of the slide 18 bears against the base of the slide opening 16 with there being a comparatively large bearing surface such that, in the event of oblique loadings, a tilting of the slide 18 and therefore of the wheels 26, 26' is minimized and shock loadings do not result in damage to the housing 10.

Figure 5:
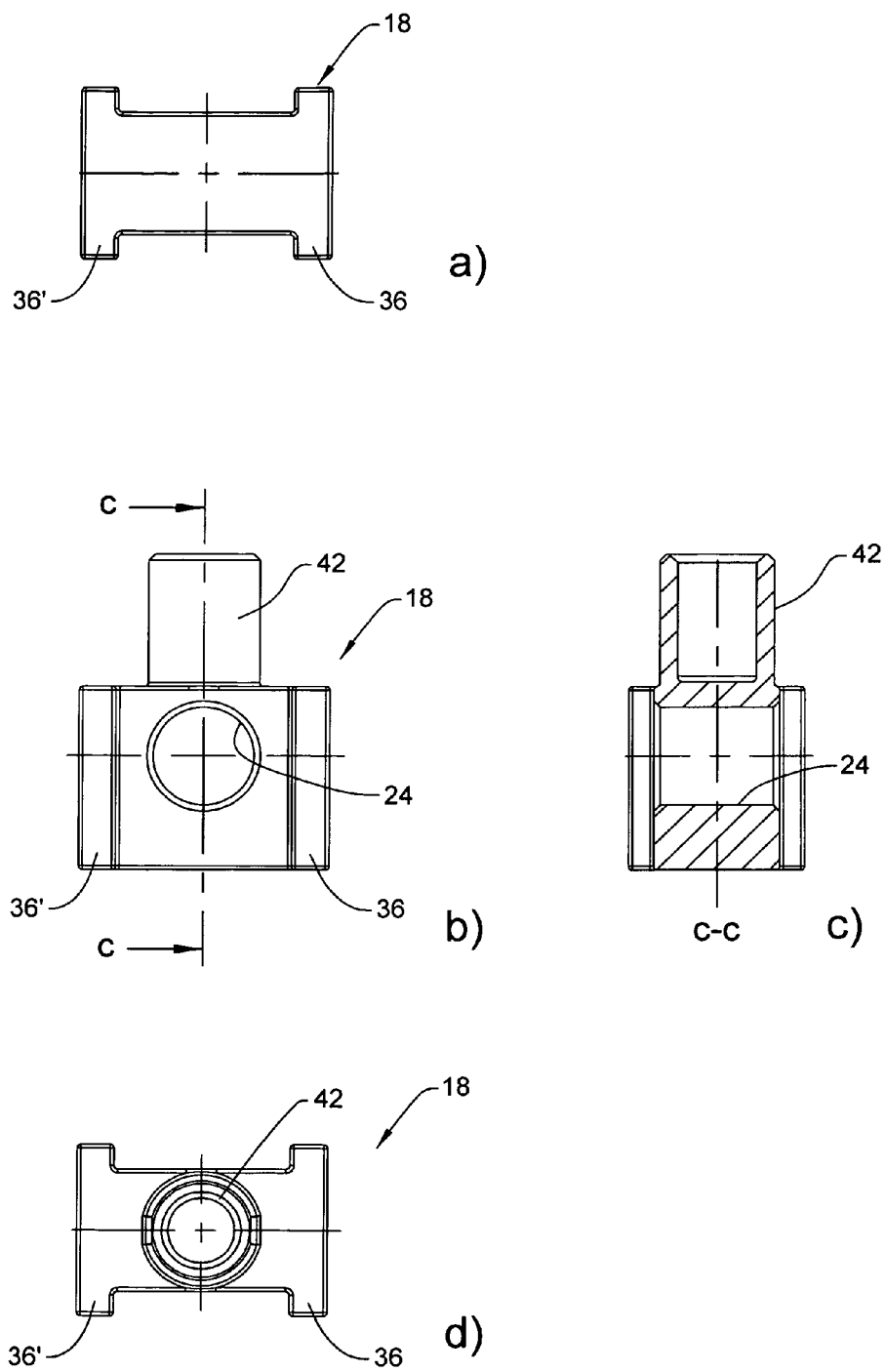
FIG. 5a shows a view of the dumbbell-shaped slide of the caster from below.
FIG. 5b shows a side view of the dumbbell-shaped slide.
FIG. 5c shows a section through the dumbbell-shaped slide along the line c-c in FIG. 5b.
FIG. 5d shows a view of the dumbbell-shaped slide from above.

A dumbbell-shaped embodiment of the slide 18 is shown in FIG. 5. The dumbbell-shaped slide 18 functions in the same manner as the previously discussed embodiment illustrated in FIG. 3 except for having the ribs 36, 36' disposed at opposite ends of the slide 18.

Figure 4:
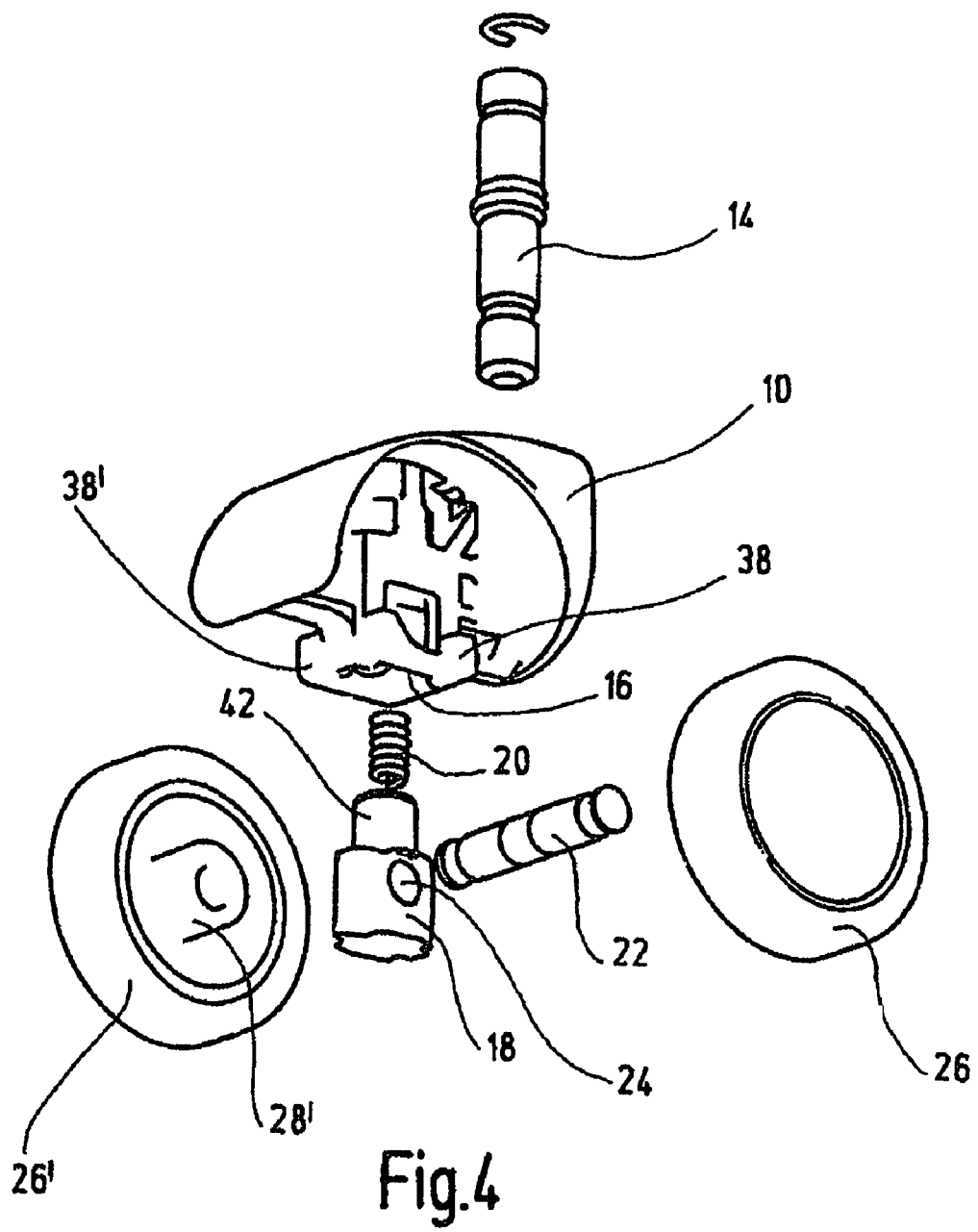
FIG. 4 shows a perspective exploded illustration of the caster.

The assembly of the caster can be explained with reference to FIG. 4. First of all, the spring 20 is inserted into the connecting piece 42 of the slide 18 and introduced together with the latter into the slide opening 16 as far as the rolling position such that the passage opening 24 is opened up for the axle pin 22 and there is sufficient clearance between the axle pin 22 and the projections 38, 38' for the hubs of the wheels. The axle pin 22 is then pressed into the passage opening 24 in a centered manner. Finally, the wheels 26, 26' are pushed by means of their tubular hubs 28, 28' onto the axle pin 22 where they latch with beads into undercuts or grooves in the axle pin 22. The insertion of the pivot pin 14 into the pin opening 12 can take place before or after assembly of the slide, the axle pin and the wheels.

In summary, the following is to be emphasized: the invention relates to a twin-wheel caster 26, 26', with a housing 10 having an essentially vertically oriented, top-side pin opening 12 for receiving a pivot pin 14 in order to connect the caster to an item of furniture or to another object, with a shaft-shaped, bottom-side slide opening 16 which is offset laterally with respect to the pin opening 12 and is intended for receiving a slide 18 which is supported in the housing 10 via a spring 20, has a passage opening 24, which is oriented essentially transversely with respect to the slide opening 16, for an axle pin 22 which bears the wheels 26, 26', and which is arranged in the housing 10 in a manner such that it can be displaced between a rolling position and a braking position, and with recesses 32 in the wall portions bounding the slide opening, for the passage of the axle pin 22. In order, with simple means, to make possible a reliable braking action, and at the same time to keep dirt away from the inner housing regions, it is proposed according to the invention that the housing 10 has, in its lower region, two projections 38, 38' which adjoin the slide opening 16, protrude laterally from the housing wall and on which hubs 28, 28' of the wheels 26, 26' are frictionally supported in the braking position.

The invention claimed is:

1. A twin-wheel caster comprising a housing having an essentially vertically oriented, top-side pin opening receiving a pivot pin which connects the caster to an item of furniture or to another object, a shaft-shaped, bottom-side slide opening in the housing which is offset laterally with respect to the pin opening and receives a slide which is supported in the slide opening via a spring and can be displaced between a rolling position and a braking position, a passage opening provided in the slide, oriented essentially transversely with respect to the slide opening and containing an axle pin bearing wheels, and recesses provided in the housing wall bounding the slide opening for passage of the axle pin, characterized in that the housing has, in its lower region, two projections which adjoin the slide opening, protrude laterally from the housing wall and frictionally support the hubs of the wheels in the braking position.

2. The caster as claimed in claim 1, characterized in that the projections extend at least throughout the width of the slide opening.

3. The caster as claimed in claim 1, characterized in that the projections which protrude laterally from the housing wall have partially circular depressions which adjoin the recesses in the wall portions bounding the slide opening and on which outside portions of the hubs of the wheels bear in a surface-to-surface manner over part of the circumference in the braking position.

4. The caster as claimed in claim 1, characterized in that the slide is supported in the rolling position at an upper portion of the slide opening.

5. The caster as claimed in claim 1, additionally comprising a blind hole adjoining the slide opening and containing a socket piece arranged on the slide, the blind hole extending into the slide a distance less than the free length of the spring which is accommodated in it.

6. The caster as claimed in claim 1, characterized in that the slide has an essentially rectangular cross-section with two integrally formed guide ribs which are arranged transversely with respect to the opening of the slide.

7. The caster as claimed in claim 1, characterized in that the slide has an essentially dumbbell-shaped cross-section with respective T-shaped end portions.

8. The caster as claimed in claim 1, characterized in that the axle pin is pressed into the passage opening of the slide.

9. The caster as claimed in claim 1, characterized in that the axle pin is provided on both sides of the housing with two undercuts which are arranged at a distance from each other and engage with beads on the inside of the tubular hubs.

10. The caster as claimed in claim 1, characterized in that the hubs of the wheels extend axially towards the wall portions which bound the slide opening.

11. The caster as claimed in claim 1, characterized in that at least one of the housing and the slide is composed of a polypropylene or polyamide plastic.

\* \* \* \* \*